Figure 1:
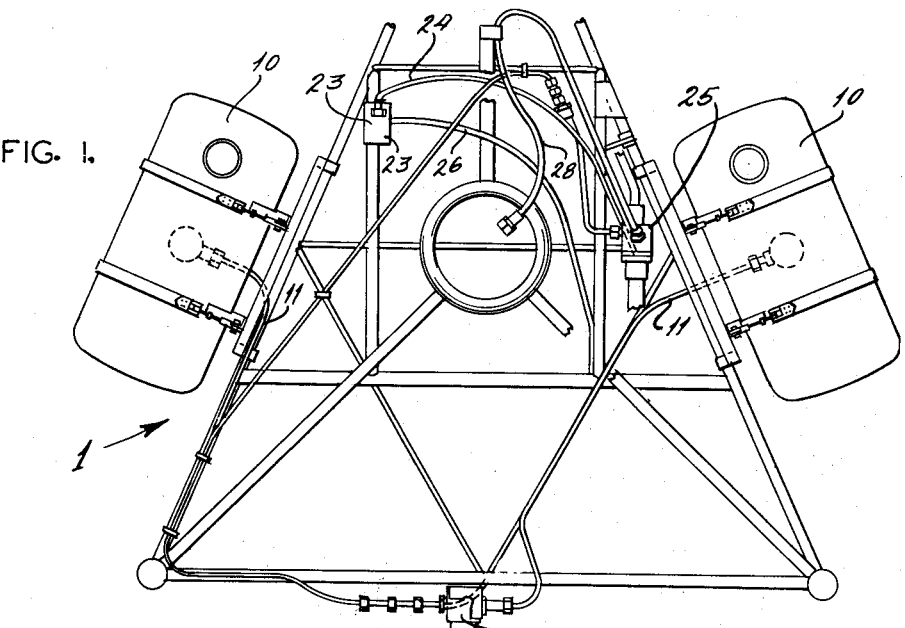

Aug. 30, 1955     E. W. TONEY ET AL     2,716,459
FUEL SUPPLY FOR RAM JET POWERED HELICOPTERS

Filed Jan. 5, 1950     5 Sheets-Sheet 1

INVENTORS:
Ernest W. Toney,
Harold H. Ostloff,
Aleb C. Ballauer
By Carr & Carr & Gravely,
THEIR ATTORNEYS.

INVENTORS:
Ernest W. Toney,
Harold H. Ostroff,
Alb C. Ballauer,
By Carr & Carr & Gravely,
THEIR ATTORNEYS.

Aug. 30, 1955 E. W. TONEY ET AL 2,716,459
FUEL SUPPLY FOR RAM JET POWERED HELICOPTERS
Filed Jan. 5, 1950 5 Sheets-Sheet 3
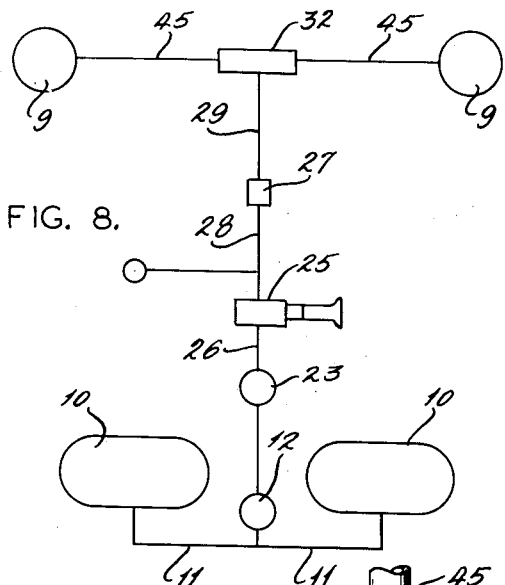
FIG. 8.
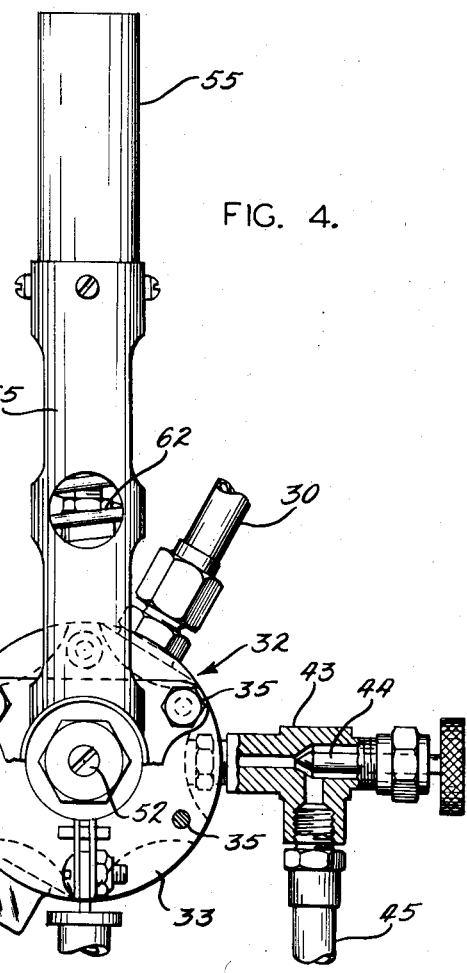
FIG. 4.
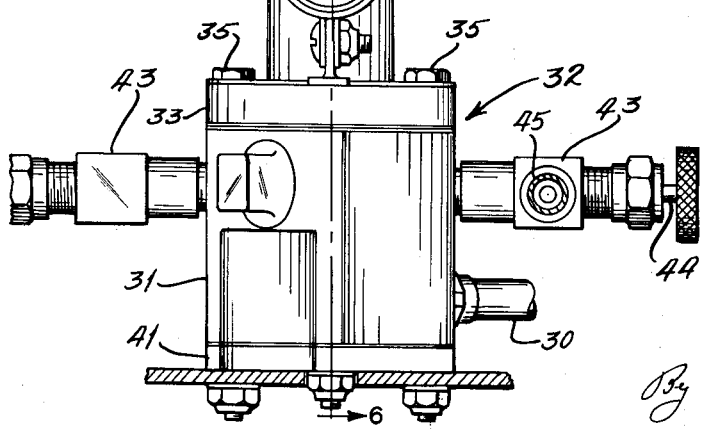
FIG. 5.
INVENTORS:
Ernest W. Toney,
Harold H. Ostoff,
Alb C. Ballauer,
By Carr & Carr & Gravely
THEIR ATTORNEYS.

United States Patent Office 2,716,459
Patented Aug. 30, 1955

2,716,459

FUEL SUPPLY FOR RAM JET POWERED HELICOPTERS

Ernest W. Toney, Normandy, and Harold H. Ostroff and Alb C. Ballauer, Ferguson, Mo., assignors to McDonnell Aircraft Corporation, St. Louis, Mo., a corporation of Maryland Application January 5, 1950, Serial No. 136,942

8 Claims. (Cl. 170—135.4)

This invention relates to fuel systems for rotary wing aircraft and is more particularly directed to a fuel supply system for helicopters powered by jet engines mounted on the tips of the helicopter blades.

The primary object of the invention is to provide a fuel supply system for rotor blade tip mounted jet engines in which the pressure of the supply is regulated by speed responsive valves operated by the rotor.

Another object of the invention is to provide a control valve for a fuel system for rotor blade tip mounted jet engines in which the valve is controlled by an inertia device operated by the rotor.

A further object of the invention is to provide a control valve for the fuel supply system of rotative winged aircraft regulated by a speed responsive device driven by the rotatable wings thereof.

The invention consists in the provision of a fuel supply system for aircraft of the above type, including a governor responsive to the aircraft rotor speed that operates a valve for regulating the fuel supply to the engines mounted on the tips of the rotor blades, the valve restricting fuel flow when the rotor speed exceeds a certain value.

The invention further consists in the provision of a fuel supply system including a rotor driven pump and a manual pump that delivers fuel to a rotor governor operated valve and in means for metering the fuel passing the governor valve before delivery to the engines mounted on the rotor blade tips.

Figure 2:
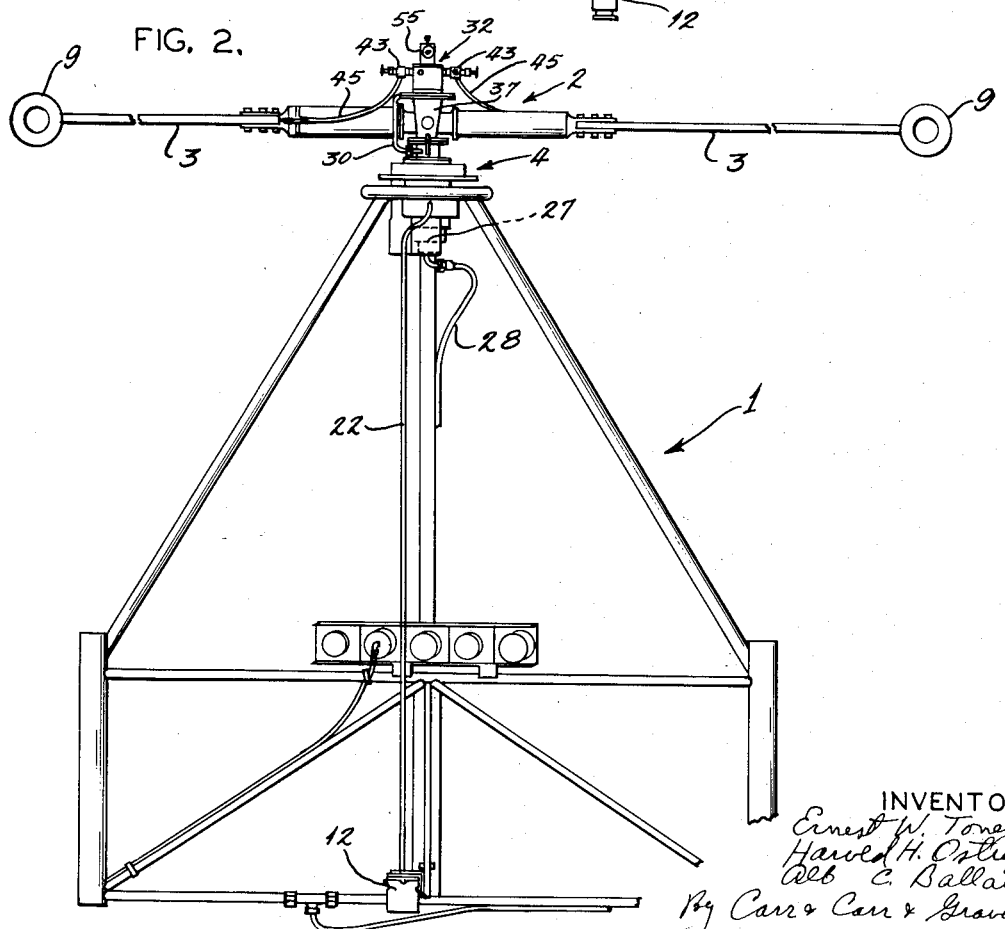
Figure 3:
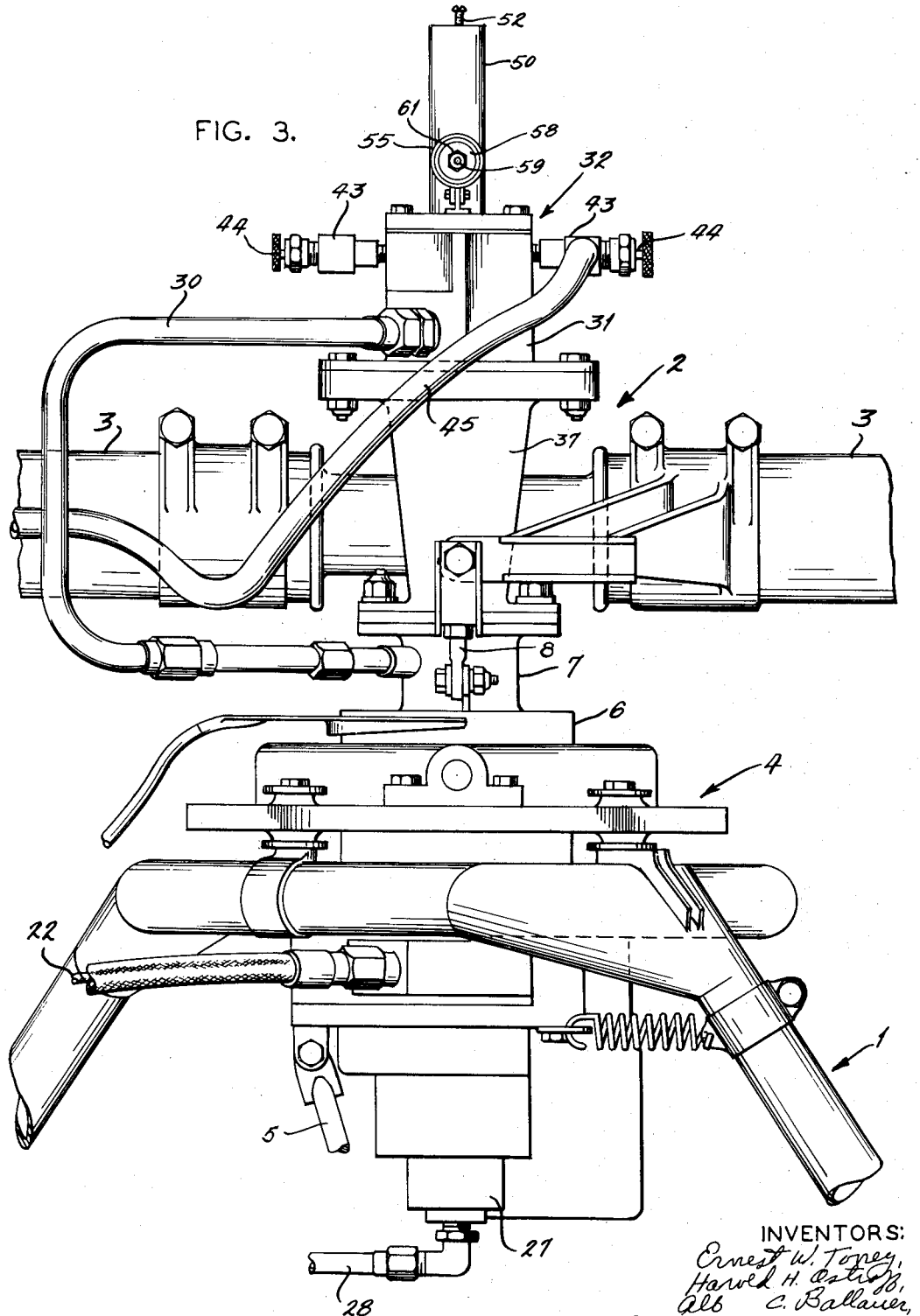
Figure 6:
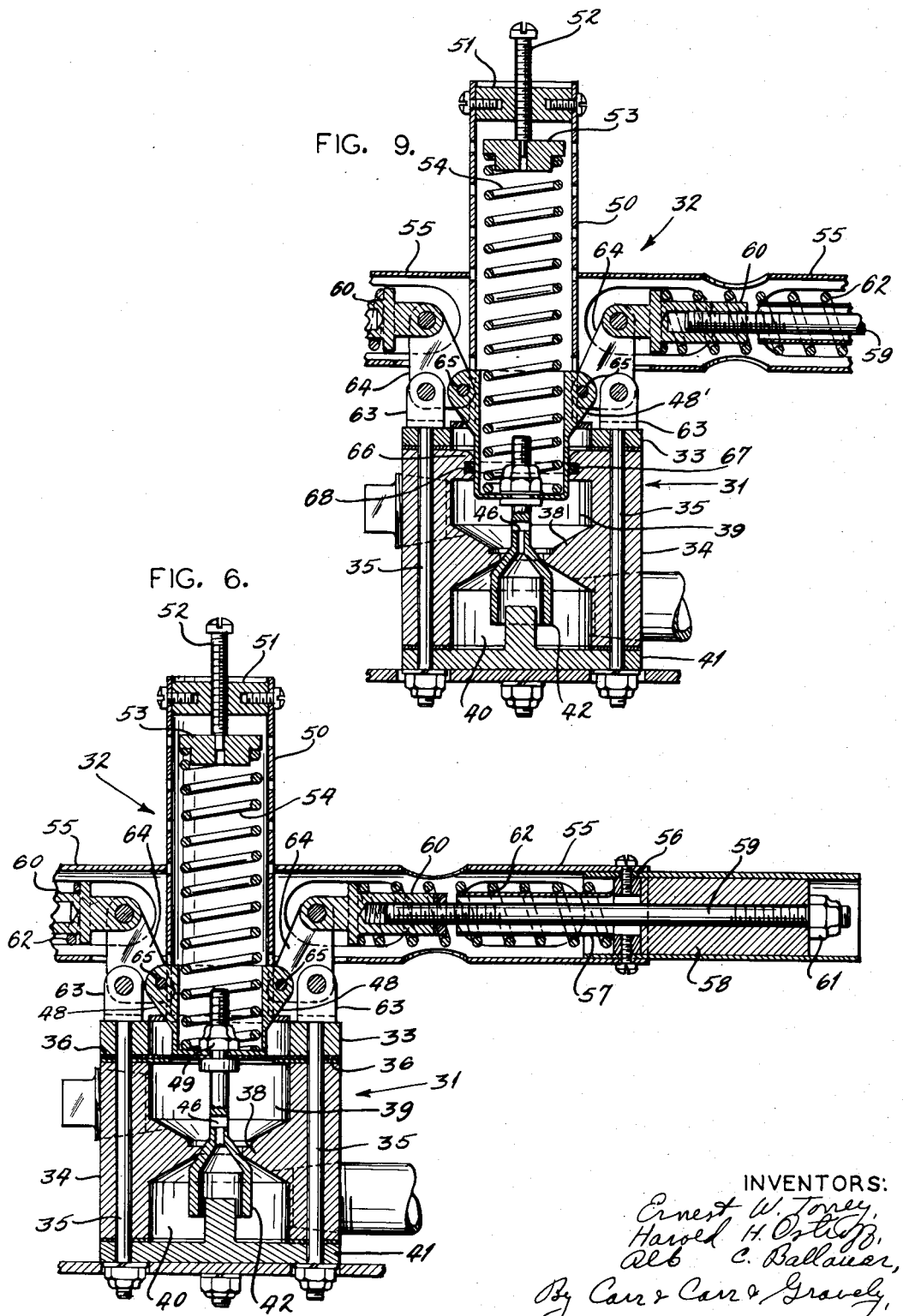
Figure 7:
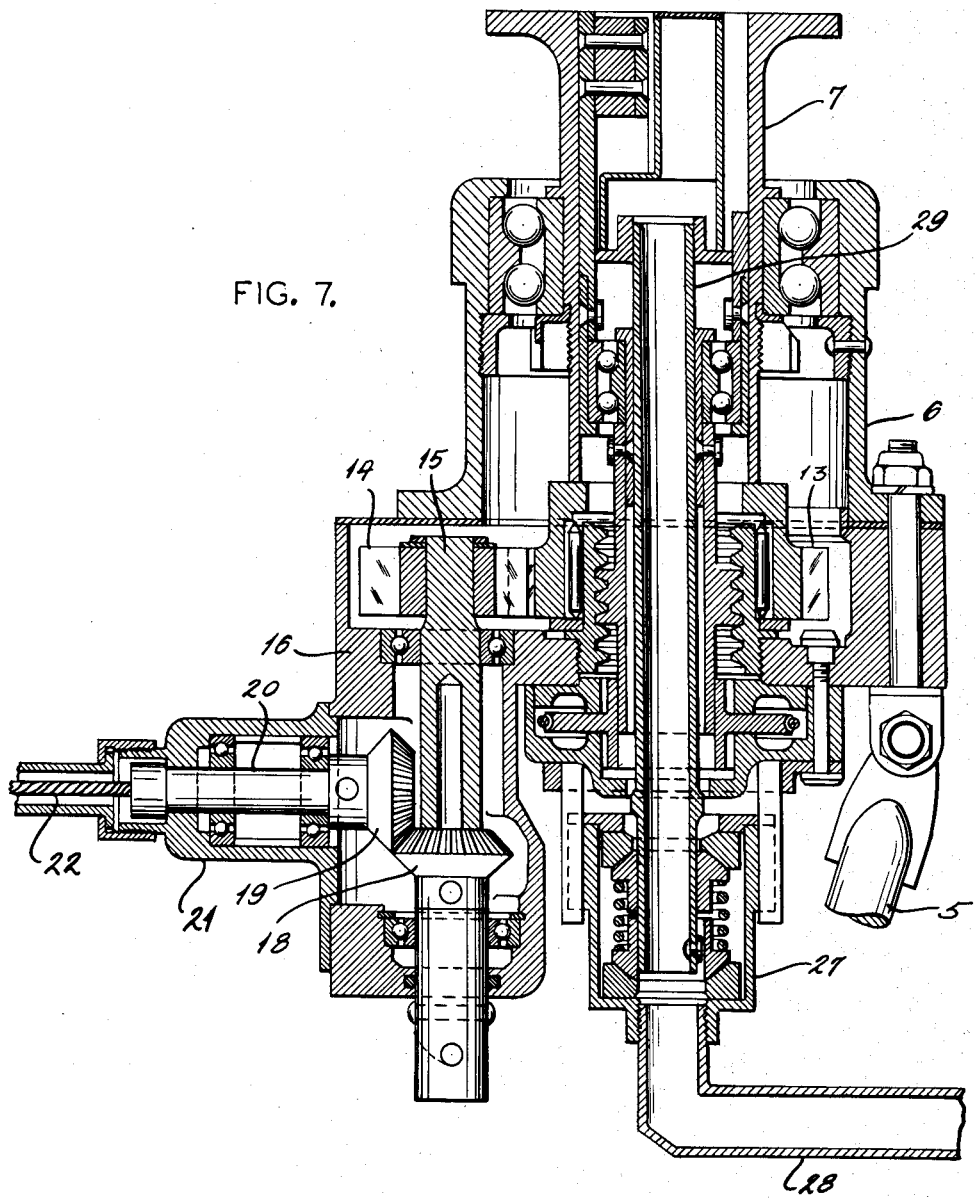

In the drawings:

Fig. 1 is a plan view of a helicopter incorporating the invention with parts omitted to show detail, Fig. 2 is a front elevational view thereof, Fig. 3 is an enlarged elevational view of the rotor supporting and fuel control means, Fig. 4 is a partial plan view of the governor controlled valve and the metering valve, Fig. 5 is a partial side elevational view thereof, Fig. 6 is a sectional view taken along the line 6—6 of Fig. 5, Fig. 7 is a vertical sectional view of the rotor shaft assembly, Fig. 8 is a diagrammatic view of the fuel supply system; and Fig. 9 is a modified form of the governor controlled valve.

The fuel supply system to be described is particularly useful in aircraft of the type described in Zakhartchenko application Serial No. 7,129, filed February 9, 1948, now Patent No. 2,689,011, and entitled "Helicopter Rotor Construction." The numeral 1 designates the frame of the aircraft, the details of which are more particularly described in the above entitled application. A rotor 2 consisting of diametrically arranged blades 3 is suitably supported in a gimbal ring assembly 4 mounted on frame 1. A lever 5 pivoted in frame 1 and secured to a bearing frame 6, controls the plane in which the rotor operates, the rotor being supported on a shaft 7 rotatably mounted in the gimbal ring assembly 4. Pitch adjusting levers 8 (only one being shown) are operated through the shaft 7 by a suitable linkage (not shown) and ram jet engines 9 mounted on the outboard end of the blades 3 provide the motive power for driving the rotor 2 and its component blades.

The fuel supply for the engine originates in fuel tanks 10 suitably secured to the frame 1 and is conducted thereto through a system of pumps and conduits. Fuel is drawn from each of the tanks through conduits 11, each of which terminates in pump 12. Pump 12 is driven by the rotor 2. The shaft 7, to which the rotor is secured, is provided with a gear 13 meshing with a gear 14 secured to shaft 15 rotatably supported in a projecting portion 16 forming a part of the gimbal ring support. The part of shaft 15 which extends through the projecting portion is employed for receiving a crank (not shown) or other rotor starting means. The shaft 15 has a bevel gear 18 thereon that meshes with a bevel gear 19 secured to a stub shaft 20 rotatably mounted in a journal housing 21. A flexible shaft 22 connects the stub shaft 20 with the pump for driving the latter.

The fuel discharged from pump 12 is conducted to a hand-operated pump 23 through conduit 24. The hand pump is provided for the purpose of supplying engines 9 with fuel during starting and, when necessary, during low speed operation. The hand-operated pump contains a by-pass valve (not shown) so that it will not interfere with the operation of the rotor driven pump 12.

The fuel is conducted from pump 23 to a throttle valve 25 by means of conduit 26 and is conducted to the rotary coupling 27 from the throttle valve by means of a conduit 28. The rotary coupling 27 permits the tube 29 to be rotated about conduit 28 without loss of pressure or fuel while the rotor is in operation. The tube 29 is connected to a conduit 30 through the wall of shaft 7, terminating in a housing 31 of the governor controlled device 32.

One embodiment of the valve device is illustrated in Figs. 4, 5 and 6 of the drawings in which the housing is divided into two parts 33 and 34 secured together by bolts 35. A diaphragm 36 is interposed between parts 33 and 34 and the entire governor controlled valve device is secured to perch 37 mounted on shaft 7. The effective area of diaphragm 36 may be varied by a mask 36'. The part 34 is provided with a seat 38 forming chambers 39 and 40 in conjunction with diaphragm 36 and closure 41 for the housing 31, the closure being clamped in place by bolts 35. A valve member 42 is disposed within the housing 31 and is engageable with seat 38, thus controlling the flow of fuel from chamber 40 into chamber 39. The fuel flows from chamber 39 into valve fittings 43 each provided with a metering valve 44 suitably adjustably mounted in the fittings. The conduits 45 are connected to fittings 43 and terminate in engines 9, a portion of the conduit being located within blades 3, thus supplying fuel to the engines. This fuel is initially ignited in the engines by means well known to the art but not shown herein.

The flow of fuel to the engines 9 is controlled in part by the rotor speed. The rotor controls the setting of valve 42 through the medium of the governor device indicated at 32. The device is provided with a cup 48 secured to valve stem 46 and a shoulder 47 on the stem abuts the diaphragm 36. The stem extends up through the diaphragm and into the cup 48. The cup is clamped to the diaphragm and shoulder by means of a nut 49 threaded onto valve stem 46. A tubular member 50 is secured to and rests on part 33 and is provided with a closure 51 suitably held in the upper end thereof. A screw 52 is threaded into closure 51 and a collar 53 is held by the screw. A spring 54 is disposed between the collar 53 and the closed end of cup 48, the spring acting in response to pressure applied to the diaphragm, moving cup 48 downwardly along with diaphragm 36. The tubular member acts as a cover as well as a support for closure 51 functioning as an abutment for the spring 54. The spring 54 moves the diaphragm and valve member 42 downwardly, thus permitting fuel to flow between seat 38 and the valve member. The valve member 42 is moved to closed position by the pressure of fuel acting on diaphragm 36 and by the action of the governor after a predetermined rotor speed has been reached. Below the predetermined speed, the springs associated with the governor move the diaphragm and valve member toward open position.

The governor device comprises tubular members 55 suitably mounted on housing 31. An abutment collar 56 is mounted in the tubular member and is provided with a spring guide sleeve 57 secured to one side thereof. A flyweight 58 is slidably mounted in tubular member 55 and a rod 59 extends through a bore therein, thence through collar 56 and sleeve 57, after which it is threaded into a fitting 60. The opposite end of the rod 59 has a nut 61 thereon for holding the flyweight in position in the tubular member 55. A spring 62 is disposed between a shoulder on fitting 60 and the abutment collar 56. The screw 35 is provided with a slotted head 63 in which a bell crank 64 is pivotally mounted, one arm of the bell crank being pivoted to fitting 60 and the other pivotally secured to ear 65 formed on cup 48. Each tubular member 55 is similarly equipped, thereby causing the up and down motion of the springs 62 on cup member 48 to be uniform.

The fuel entering chamber 39 acts on the diaphragm 36, tending to move valve member 42 to closed position. This action is opposed, in part, by spring 54 and governor springs 62 which tend to open valve member 42 provided the rotor 2 is operating below a predetermined speed. The metering valves measure the flow of fuel into conduits 45. By reason of the centrifugal action, the pressure of fuel in conduit 45 will build up so that upon its admission to engines 9, it will do so at the desired pressure of about 1500 pounds per square inch. When the rotor speed exceeds a predetermined amount, the flyweights 58 will move outwardly, further compressing springs 62 and moving valve member 42 toward closed position, thus restricting the fuel flow and reducing the rotor speed. When the rotor speed is reduced to an amount less than the predetermined value of valve springs 54 and 62, they will move valve member 42 toward open position.

A modified form of governor device is illustrated in Fig. 9. The diaphragm in Fig. 6 is replaced by a plate 66 having a bore therein through which the lower end of an elongated cup 48' extends. The plate has an O ring 67 inserted in an internal groove 68 cut in the bore in said plate. The purpose of the O ring is to prevent escape of pressure fluid from chamber 39. The operation of the modified device is similar to that shown in Fig. 3 except that fuel acts on the lower end only of the cup 48'.

What we claim is:

1. A fuel supply system for rotary wing aircraft comprising wing tip mounted jet engines, a fuel supply, means connecting said fuel supply to said jet engines including therein a pump and a valve housing connected together in fuel flow relation, said housing having fuel receiving and delivering chambers in communication through a common port, a valve element in said housing to control fuel flow through said port from the receiving chamber to the delivery chamber, resiliently displaceable means carried by said housing adjacent said delivery chamber in connection with said valve to urge the valve in a port opening direction against the pressure of fuel in said delivery chamber, weight means rotating with the rotary wing and subject to centrifugal force due to rotary wing rotation and connected to said displaceable means to urge said valve in a port closing direction, resilient means connected to said weight means to continuously oppose the centrifugal force generated thereby, whereby to maintain said port open to the flow of fuel below a predetermined maximum speed of rotary wing rotation, and metering valve means connected to said housing delivery chamber to meter the fuel prior to delivery to said jet engines.

2. A fuel supply system for rotary wing aircraft including wing tip mounted jet engines, a fuel supply, a fuel control valve housing having a fuel receiving chamber and a fuel delivery chamber, a supply conduit connected between said fuel supply and said housing receiving chamber, delivery conduits connected between said delivery chamber and said jet engines, pump means connected into said supply conduit, a valve in said housing movable for opening and closing communication between said receiving and delivery chambers, displaceable means carried by said housing and operatively connected to said valve to urge the valve in an opening direction, weight means rotating with the rotary wing to be subject to the centrifugal force of such rotation and connected to said displaceable means to urge the valve in a closing direction, spring means connected to said weight means to urge the latter in a valve opening direction, said spring means dominating the centrifugal force effect of said weight means for rotary wing speeds below a predetermined maximum speed, and metering valve means inserted in said delivery conduits to equalize the fuel flowing centrifugally outwardly toward each of said tip mounted jet engines.

3. A fuel supply system for rotary wing aircraft comprising wing tip mounted jet engines, a fuel supply, means connecting said fuel supply to said jet engines including a pump, a valve housing and metering valves arranged in series, said valve housing being located in the axis of wing rotation and rotating therewith and having fuel receiving and delivery chambers in communication through a port, a valve in said housing closing said port from the fuel receiving chamber side thereof and a valve stem extending into the fuel delivery chamber side, resiliently displaceable means carried by said housing and operatively connected to said valve stem to urge the valve in a port opening direction, said resiliently displaceable means being opposed by the pressure of the fuel in said delivery chamber, weight means rotating with said housing and connected to said displaceable means to urge said valve in a port closing direction, said weight means responding to the influence of centrifugal force, and resilient means connected to said weight means to continuously oppose the centrifugal force influence thereof and maintain said port open for rotor speeds below a predetermined maximum speed.

4. A fuel supply system for jet engines mounted upon and driving a helicopter rotor, said system including a fuel supply, a fuel control valve housing rotating with the rotor and connected to said fuel supply, a fuel pump connected between said fuel supply and housing to supply the fuel under pressure to said housing, fuel feeding conduit means connected with said housing and extending to the jet engine driving the rotor, said housing having a fuel receiving chamber receiving pumped fuel from said fuel supply and a fuel supplying chamber open to said fuel feeding conduit means, a valve in said housing controlling the passage of fuel between said chambers, displaceable valve actuating means connected to said valve and resiliently urged in a direction to move said valve to establish fuel flow between said chambers, the pressure of fuel in said fuel supplying chamber acting on said displaceable actuating means in a direction to cut off fuel flow between said chambers, and governor means rotating with the rotor, said governor means having a weighted member connected to said displaceable actuating means to displace the latter and said valve in a direction to cut off fuel flow, and resilient means continuously acting on said weighted member to urge the latter in a direction to establish fuel flow for rotor speeds below a predetermined maximum speed.

5. A fuel supply system for rotative winged aircraft provided with rotor blade tip mounted prime movers comprising a rotative wing rotor, prime movers carried at the tips of said rotor, a source of fuel, a valve housing connected to said fuel source to receive fuel therefrom under pressure, said housing having an internal wall separating two adjacent chambers and a valve seat in said wall, a member movable in said housing and in one of said housing chambers to be movably responsive to fuel pressure in said one chamber, a valve for said valve seat connected to said movable member, spring means engaging said movable member to urge tthe latter in a direction to unseat said valve, weighted means rotating with said rotor and connected to said movable member to be moved thereby in a direction to seat said valve against the force of said spring means, conduits connecting said prime movers and said one housing chamber to supply fuel to said prime movers, and valve means in said conduits adjustable to meter the fuel supplied to said prime movers.

6. The fuel supply system set forth in claim 5, wherein said movable member comprises a diaphragm forming a wall of said one housing chamber, and other spring means is carried in engagement with said weighted means to oppose the force of the latter to seat said valve, said other spring means being overcome by said weighted means for rotor rotation exceeding a predetermined maximum speed.

7. The fuel supply system set forth in claim 5, wherein said movable member includes a cup movable relative to said one housing chamber in response to the pressure of fuel therein, said cup being connected to said valve and said spring means engaging said cup exteriorly of said one housing chamber, and means forming an adjustable abutment for said spring means.

8. The fuel supply system set forth in claim 5, wherein said movable member includes a cup, said weighted means being connected to said cup, and said weighted means including support members mounted adjacent said housing, slide rods in said support members, fly weights carried on said slide rods, and other spring means on said slide rods in abutment with said fly weights to oppose the centrifugal force response thereof and urge said valve from said valve seat for rotor speeds below a predetermined maximum speed.

References Cited in the file of this patent

UNITED STATES PATENTS

| | | |
|---|---|---|
| 1,527,954 | Holdsworth | Feb. 24, 1925 |
| 2,176,243 | Braungart | Oct. 17, 1939 |
| 2,216,162 | Cierva | Oct. 1, 1940 |
| 2,314,900 | Samiran | Mar. 30, 1943 |
| 2,330,056 | Howard | Sept. 21, 1943 |
| 2,336,052 | Anderson et al. | Dec. 7, 1943 |
| 2,407,139 | Clothier | Sept. 3, 1946 |
| 2,446,266 | Cummings | Aug. 3, 1948 |
| 2,474,685 | McCollum | June 28, 1949 |
| 2,485,502 | McCollum | Oct. 18, 1949 |
| 2,500,618 | Pugh et al. | Mar. 14, 1950 |
| 2,514,749 | Dobbins | July 11, 1950 |
| 2,581,275 | Mock | Jan. 1, 1952 |

FOREIGN PATENTS

| | | |
|---|---|---|
| 5,150 | Great Britain | of 1914 |
| 21,686 | Norway | Aug. 21, 1911 |
| 227,151 | Great Britain | Jan. 12, 1925 |
| 614,676 | Great Britain | Dec. 20, 1948 |